United States Patent
Lim et al.

(10) Patent No.: US 8,216,483 B2
(45) Date of Patent: Jul. 10, 2012

(54) PREPARATION OF SUPER WATER REPELLENT SURFACE

(75) Inventors: Hyun Eui Lim, Daejeon (KR); Dae Hwan Jung, Daejeon (KR); Jung Hyun Noh, Daejeon (KR); Wan Doo Kim, Daejeon (KR)

(73) Assignee: Korea Institute of Machinery and Materials, Daejeon (KR)

( * ) Notice: Subject to any disclaimer, the term of this patent is extended or adjusted under 35 U.S.C. 154(b) by 465 days.

(21) Appl. No.: 12/532,916

(22) PCT Filed: Dec. 11, 2007

(86) PCT No.: PCT/KR2007/006445
§ 371 (c)(1),
(2), (4) Date: Sep. 24, 2009

(87) PCT Pub. No.: WO2008/123650
PCT Pub. Date: Oct. 16, 2008

(65) Prior Publication Data
US 2010/0038342 A1 Feb. 18, 2010

(30) Foreign Application Priority Data
Apr. 5, 2007 (KR) .................. 10-2007-0033641

(51) Int. Cl.
*C25F 3/00* (2006.01)
*B44C 1/22* (2006.01)
*C03C 15/00* (2006.01)
(52) U.S. Cl. ................. 216/41; 216/11; 216/42; 216/47
(58) Field of Classification Search .................... 216/42, 216/47
See application file for complete search history.

(56) References Cited

U.S. PATENT DOCUMENTS

| 5,250,322 | A | 10/1993 | Takahashi et al. |
| 6,780,491 | B1* | 8/2004 | Cathey et al. ................... 216/11 |
| 2004/0033691 | A1* | 2/2004 | Frendt ........................... 438/689 |
| 2009/0274873 | A1* | 11/2009 | Shinotsuka .................... 216/11 |

FOREIGN PATENT DOCUMENTS

| JP | 4-124047 | 4/1992 |
| JP | 5-832 | 1/1993 |
| KR | 10-0216872 | 6/1999 |
| KR | 1999-0054157 | 11/1999 |
| KR | 10-0547201 | 8/2000 |
| KR | 10-0547201 | 8/2008 |

OTHER PUBLICATIONS

Shiu, Jau-Ye et al., Communications, "Chemistry of Materials," American Chemical Society, vol. 16, No. 4, Feb. 24, 2004.

* cited by examiner

*Primary Examiner* — Shamim Ahmed
*Assistant Examiner* — Bradford Gates
(74) *Attorney, Agent, or Firm* — Lowe Hauptman Ham & Berner, LLP

(57) ABSTRACT

A super water repellent surface is prepared by arranging plural spherical beads on a substrate surface to form a (N)-th bead layer, etching the substrate surface with the (N)-th bead layer as an etching mask, arranging plural spherical beads, which are larger than the (N)-th beads in diameter, on the substrate surface to form a (N+1)-th bead layer, etching the substrate surface with the (N+1)-th bead layer as an etching mask, removing the beads from the etched substrate surface and coating a fluorine compound on the substrate surface on which a hierarchical concavo-convex structure has been formed. The (N+1)-th bead layer forming step and the (N+1)-th etching step are repeated N times.

13 Claims, 3 Drawing Sheets

[Fig. 1]
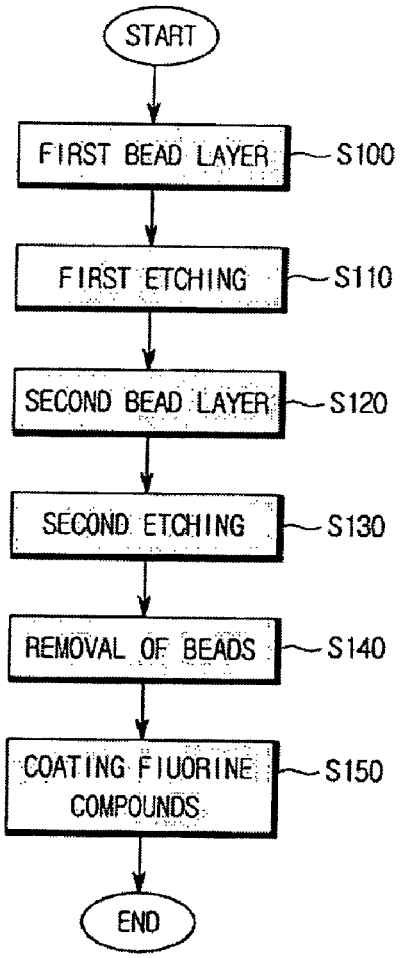
[Fig. 2]
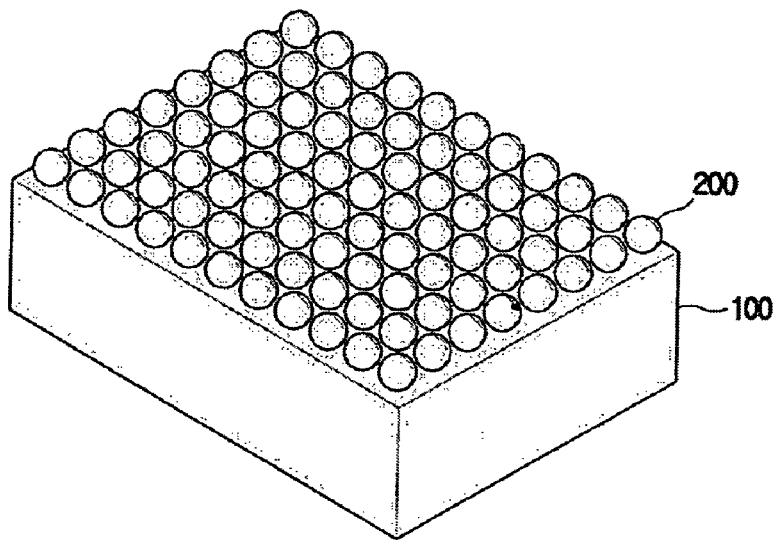

[Fig. 3]
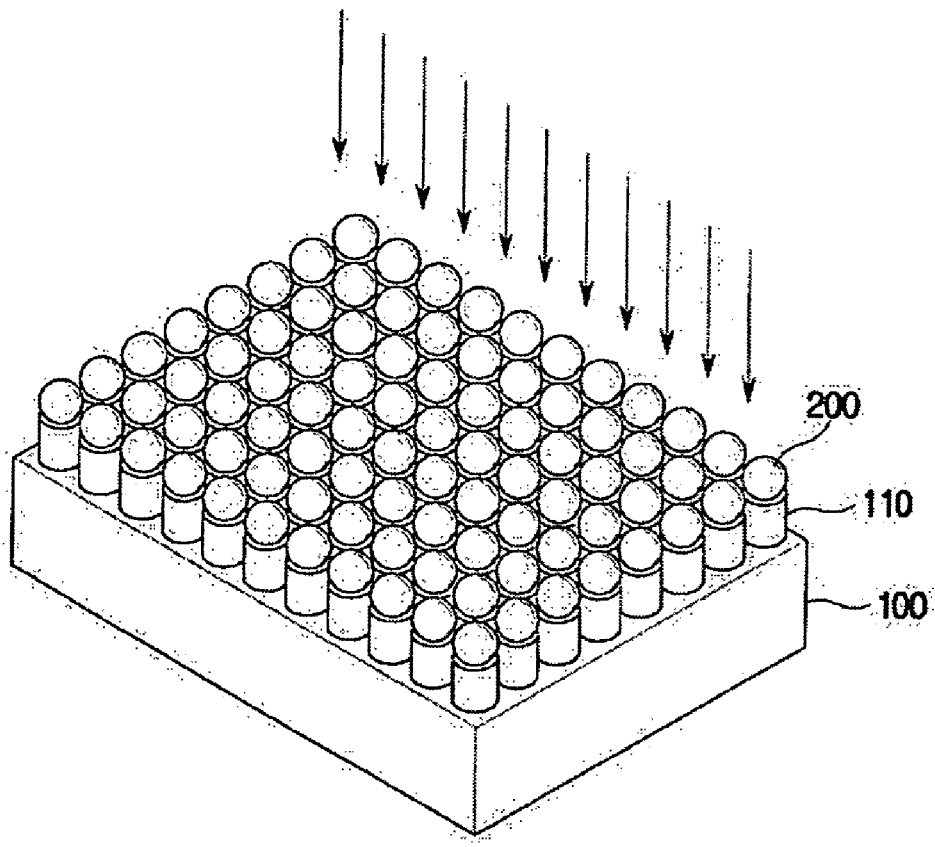
[Fig. 4]
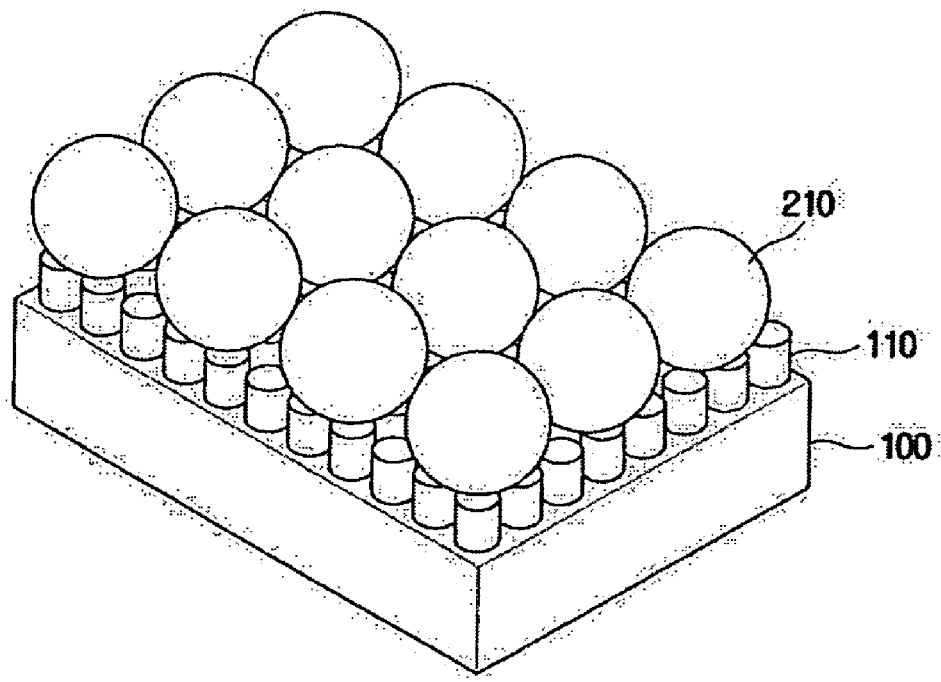

[Fig. 5]
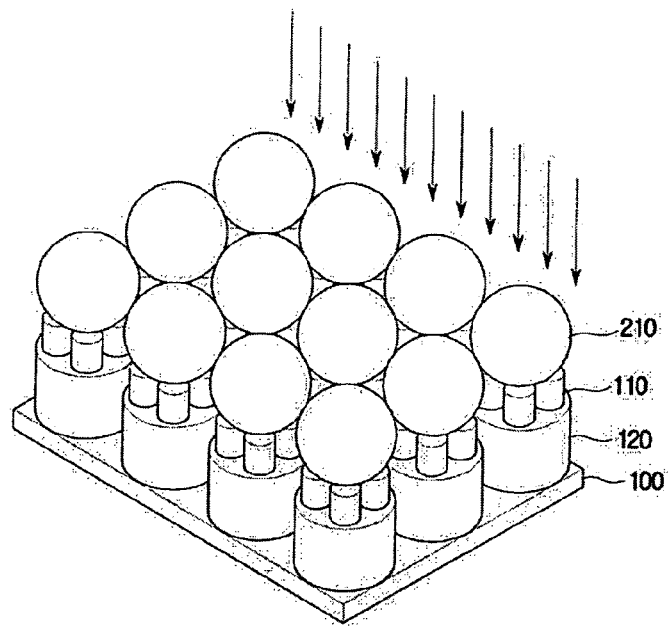
[Fig. 6]
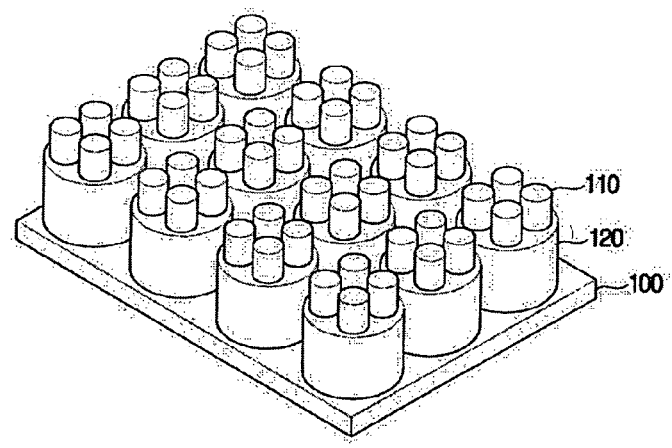
[Fig. 7]
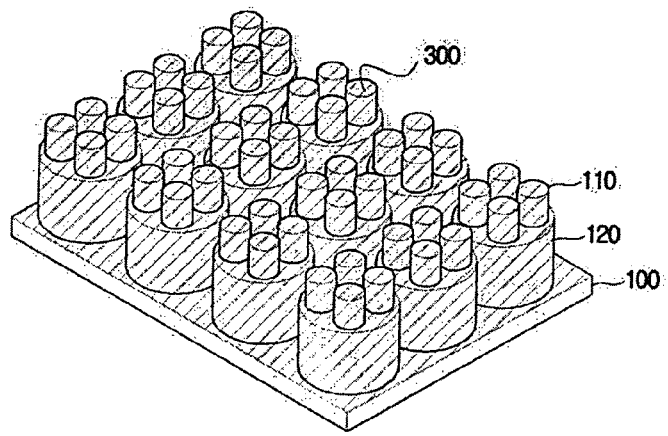

PREPARATION OF SUPER WATER REPELLENT SURFACE

RELATED APPLICATIONS

The present application is based on, and claims priority from, KR Application Number 10-2007-0033641, filed Apr. 5, 2007, and PCT Application Number PCT/KR07/006,445, filed Dec. 11, 2007, the disclosures of which are hereby incorporated by reference herein in their entireties.

TECHNICAL FIELD

The present invention relates to a process for the preparation of a super water repellent surface, more particularly to a process for the preparation of a super water repellent surface with outstandingly improved water repellency.

BACKGROUND ART

In general, water repellency refers to a water-resistant property or hardness to get wet by water. The super water repellent surface technique is a kind of surface modification technique to control the wetting of a surface. Through physical or chemical surface modification of a solid surface, the technique aims at maintaining the contact angle of the solid surface with water at 150° or more.

A representative model of a super water repellent surface is the leaves of lotus, the surface of which has numerous micro-sized cilia and is coated with a waxy substance.

The wax coating also has been identified to have a regular nanostructure. It is known that such a micro/nano hierarchical structure results in a super water repellent surface and leads to a self-cleaning effect.

Recently, researches about preparing a super water repellent surface having more improved water repellency by mimicking the micro/nano hierarchical structures existing in the nature are drawing attentions.

The researches on super water repellency are gaining attention not only in the field of science but also in various industries, with regard to construction materials, cosmetics, fiber treatment, electric/electronic components, etc.

In general, the surface of glasses used in vehicles and buildings have a small contact angle with water of about 20-40° Thus, when it rains, water flows on the glass surface while forming an inhomogeneous water film.

Such an inhomogeneous water film leads to light scattering on the windowpane of vehicles, thereby interfering the drivers vision especially at night or during raining. It also leads to an easy contamination of the glass surface of building windows with dust, yellow sand, and so forth.

By significantly reduce the surface energy of the glass surface, it will be possible to make the shape of water droplets spherical, so that they may roll down off the surface, and the glass will hardly get wet by water.

Such a glass is called the super water repellent glass. When used for vehicles, the super water repellent glass can prevent the distortion of vision caused by the inhomogeneous water film and offer a clear vision, thereby preventing car accidents.

And, if the super water repellent glass is used in the windows of large high-rise buildings, which are difficult to clean, impurities attached on the super water repellent glass are easily removed as spherical water droplets roll down off the glass surface because of low surface energy. Such a self-cleaning effect is very advantageous in the maintenance of buildings.

The contact angle of a water droplet on a solid surface is the index of the water repellency. In general, a surface having a contact angle of 90 or more is called a water repellent (hydrophobic) surface. And, a surface having a contact angle of 110 to 150 is called a highly water repellent surface. If the contact angle is 150 or more, the surface is called a super water repellent surface.

Formerly, since the 1950s, the researches on the development of the water repellency technology were focused on developing materials having a chemical structure leading to a low surface energy. In the 1980s, it was discovered that not only the surface chemical property but also the geometric spatial structure is an important factor affecting the super water repellency.

Water repellent films coated with various fluorine based materials are an example of utilizing materials with low surface energy. But, with the low surface energy alone, it is difficult to obtain a contact angle of 150 or larger. Hence, the control of the surface microstructure is required to obtain a super water repellent material having contact angle of 150 or larger.

It is reported that a surface having a water contact angle of 132 to 170 was prepared through nanosphere lithography and dry etching using oxygen plasma (Peilin Chen, et al. *Chem. Mater.*, vol. 16, no. 4, 561, 2004).

However, this research is no more than assembling polystyrene nanospheres on a gold film in a single layer or double layers and modifying the size and form of the polystyrene nanospheres using oxygen plasma. It offers unsatisfactory water repellency because the solid surface itself is not etched to form a concavo-convex structure.

According to Korean Patent Publication No. 1997-007696, "Preparation of water repellent glass and product prepared thereof", a solution containing a silicon alkoxide based compound and an organic solvent is hydrolyzed to form a silica film and a water repellent layer is coated to prepare a water repellent glass. But, the water contact angle is only around 100° and the super water repellency is not attained.

Korean Patent Publication No. 1999-0001695, "Concavo-convex silica film having superior durability and water repellent glass using the same" provides a water repellent glass prepared by coating a water repellent on the surface of a concavo-convex silica film. However, because the colloidal silica resulting from the hydrolysis and polucon-densation of a silane compound is coated on the surface to obtain a concavo-convex structure, it is impossible to obtain a regular concavo-convex structure with wanted scale.

DISCLOSURE OF INVENTION

Technical Problem

The present invention has been made to solve the aforesaid problems and it is an object of the present invention to provide a process for the preparation of a super water repellent surface having outstanding super water repellency and controllable transparency by forming a hierarchical concavo-convex structure on a surface and then treating with a fluorine compound.

Technical Solution

To attain the aforementioned object, the present invention provides a process for the preparation of a super water repellent surface comprising the steps of: arranging a plurality of spherical beads on the surface of a substrate to form a (N)-th bead layer; etching the substrate surface with the (N)-th bead layer as etching mask; arranging a plurality of spherical beads, which are larger than the (N)-th beads in diameter, on the substrate surface to form a (N+1)-th bead layer; etching the substrate surface with the (N+1)-th bead layer as etching mask; removing the beads from the etched substrate surface; and coating a fluorine compound on the substrate surface on which a hierarchical concavo-convex structure has been formed, wherein the (N+1)-th bead layer forming step and the (N+1)-th etching step are repeated for N times.

And, preferably, the (N)-th bead layer is formed on the substrate surface by at least one method selected from spin coating, dip coating, lifting up, electrophoretic deposition, chemical or electrochemical deposition and electrospray, Langmuir-Blodgett(LB), and transfer the beads monolayer to substrate using printing.

In addition, the etching may be performed by dry etching using an etching gas.

Further, the substrate is preferably selected from glass, quartz plate, silicon, plastic and polymer film.

And, the etching gas may be at least one selected from $CF_4$, $CHF_3$, $C_2F_6$, $C_3F_6$, $C_3F_8$, $C_4F_{10}$, HF, HBr, $SF_6$, $NF_3$, $SiCl_4$, $SiF_4$, $BCl_3$, $CCl_4$, $CClF_3$, $CCl_2F_2C_2ClF_5$ and $O_2$.

Preferably, the etching gas is a mixture including $H_2$.

Further, the substrate surface on which the fluorine compound has been coated may have at least one group selected from $(CF_3-)$, $-(CF_2-CF_2)_n-$, $-(O(CF_2)_m)_n-$, $-((CF_2)_mO)_n-$, $-(OC(CF_3)FCF_2)_n-$ and $-(C(CF_3)FCF_2O)_n-$ ($1 \leq m \leq 25$ and $1 \leq n \leq 100$).

And, the coating of the fluorine compound may be performed by at least one method selected from dip coating, spin coating, spray, self-assembled monolayer treatment of fluorosilane based compounds, surface polymerization by atom transfer radical polymerization of fluorine based monomers, grafting-from surface polymerization of fluorine based monomers, grafting-to surface polymerization of fluorine based compounds, surface polymerization of fluorine based compounds using plasma and surface modification of fluorine compounds using plasma.

And, N may be a natural number 49 or smaller.

Advantageous Effects

The process for the preparation of a super water repellent surface in accordance with the present invention is advantageous in that a super water repellent can be provided on a substrate surface by easily forming a hierarchical concavo-convex structure on the substrate surface and then treating it with a fluorine compound.

Further, by controlling the scale of the concavo-convex structure, the degree of transparency of a transparent substrate can be controlled at random.

Besides, the self-cleaning effect caused by the super water repellency enables the surface to be maintained clean, free from dusts or other impurities.

BRIEF DESCRIPTION OF THE DRAWINGS

FIG. 1 is a flowchart illustrating the process for the preparation of a super water repellent surface according to an embodiment of the present invention.

FIG. 2 is a schematic view of the step of forming the (N)-th bead layer in the process of FIG. 1.

FIG. 3 is a schematic view of the step of the (N)-th etching in the process of FIG. 1.

FIG. 4 is a schematic view of the step of forming the (N+1)-th bead layer in the process of FIG. 1.

FIG. 5 is a schematic view of the step of the (N+1)-th etching in the process of FIG. 1.

FIG. 6 is a schematic view of the step removing the beads in the process of FIG. 1.

FIG. 7 is a schematic view of the step of coating the fluorine compound in the process of FIG. 1.

BEST MODE FOR CARRYING OUT THE INVENTION

FIG. 1 is a flowchart illustrating the process for the preparation of a super water repellent surface according to an embodiment of the present invention. Referring to FIG. 1, the process for the preparation of a super water repellent surface according to an embodiment of the present invention comprises the steps of forming the (N)-th bead layer (S100), (N)-th etching (S110), forming the (N+1)-th bead layer (S120), (N+1)-th etching (S130), removing the beads (S140) and coating a fluorine compound (S150).

FIG. 2 is a schematic view of the step of forming the (N)-th bead layer (S100). Referring to FIG. 2, in the step of forming the (N)-th bead layer (S100), spherical beads are arranged on the surface of a substrate 100 to form the (N)-th bead layer 200.

In an embodiment of the present invention, glass is used for the substrate 100. However, the substrate 100 is not limited to glass, but quartz plate, silicon, plastic, etc. may be used, too.

Prior to forming the first bead layer 200, it is preferable to clean the substrate 100 as follows.

1% of a surfactant is dissolved in a 5% KOH solution and heated to 60° C. The substrate 100 is dipped in the prepared solution. After 10 minutes of sonication or stirring, the substrate is washed with distilled water for 5 times. Then, the cleaned substrate 100 is dried and treated for about 3 minutes in a UVO cleaner.

The (N)-th bead layer 200 is formed on the cleaned substrate 100. Preferably, the (N)-th bead layer is formed by spin coating, so that the beads may be uniformly arranged on the surface of the substrate 100.

Preferably, the beads are made of polystyrene, but polymeric or inorganic materials may be used, without limitation.

The specific procedure of the spin coating is as follows. First, a solution in which the beads are dispersed at a concentration of 2.5% is diluted with methanol including 0.25% of a surfactant. Then, spin coating is performed for 1 minute preferably at 3000 rpm.

The method of forming the (N)-th bead layer 200 is not limited to spin coating, but dip coating, lifting up, electrophoretic deposition, chemical or electrochemical deposition, etc. may be employed.

FIG. 3 is a schematic view of the step of the (N)-th etching (S110). Referring to FIG. 3, in the (N)-th etching step (S110), the substrate 100 on which the (N)-th bead layer 200 has been formed is dry etched, so that the arrangement form of the (N)-th bead layer 200 is transcribed to the substrate 100.

Preferably, the dry etching is performed using an etching gas having a good etching selectivity for the beads of the (N)-th bead layer 200 and the substrate 100.

In case the beads of the (N)-th bead layer 200 are made of polystyrene and the substrate 100 is made of glass, a preferable etching gas that has a very low etching rate for the beads and a very high etching rate for the substrate is $CF_4$. In addition, $CHF_3$, $C_2F_6$, $C_3F_6$, $C_3F_8$, $C_4F_{10}$, HF, HBr, $SF_6$, $NF_3$, $SiCl_4$, $SiF_4$, $BCl_3CCl_4$, $CClF_3$, $CCl_2F_2$, $C_2ClF_5$, etc. may be used as etching gas.

And, in order to further increase the etching selectivity, the etching gas may be a mixture with $H_2$.

Through the (N)-th etching step (S110), the (N)-th rough surface 110 is formed on the surface of the substrate 100. As such, a concavo-convex structure can be easily formed on the surface of the substrate 100 by dry etching.

FIG. 4 is a schematic view of the step of forming the (N+1)-th bead layer (S120). Referring to FIG. 4, in the step of forming the (N+1)-th bead layer (S130), spherical beads 210 are arranged on the surface of the substrate 100 on which the (N)-th rough surface 110 has been formed.

The beads 210 of the (N+1)-th bead layer have a larger diameter than the beads 200 of the (N)-th bead layer and are preferably arranged by spin coating as in the step of forming the (N)-th bead layer (S100).

FIG. 5 is a schematic view of the step of the (N+1)-th etching (S130). In the (N+1)-th etching step (S130), dry etching is performed on the surface of the substrate 100 on which the (N+1)-th bead layer 210 has been formed, as in the (N)-th etching step (S110), so that the arrangement form of the (N+1)-th bead layer 210 is transcribed to the substrate 100.

Since the beads of the (N+1)-th bead layer 210 have a larger diameter than the beads of the (N)-th bead layer 200, the scale of the (N+1)-th rough surface 120 is also larger than that of the (N)-th rough surface 110.

FIG. 6 is a schematic view of the step removing the beads (S140). Referring to FIG. 6, the beads of the (N)-th bead layer 200 and the beads of the (N+1)-th bead layer 210 are removed from the surface of the substrate 100 to result in a second order hierarchical concavo-convex structure in which the (N+1)-th rough surface 120 has been formed below the (N)-th rough surface 110.

The step of forming the (N+1)-th bead layer and the (N+1)-th etching step are repeated for N times. That is, etching is performed for N times to attain a N-th order hierarchical structure.

In a preferable embodiment of the present invention, the number N is a natural number 49 or smaller. That is, etching is preferably performed for 50 times or less to give a hierarchical structure of the 50th order or less. A hierarchical structure of the 51st order or higher does not have much improved water repellency considering the time and energy consumption required for the preparation.

Preferably, the removal of the (N)-th bead layer 200 and the (N+1)-th bead layer 210 is performed by ashing, which is frequently used in the semiconductor manufacture.

Specifically, $O_2$ plasma ashing can be applied. Alternatively, piranha solution, organic solvents, dilute HF solution and steam, ultrasonic cleaning, etc. can be used.

And, it is also possible to remove the (N)-th bead layer 200 after the (N)-th etching step (S120) and prior to the formation of the (N+1)-th bead layer 210.

In an embodiment of the present invention, a second order hierarchical concavo-convex structure is attained using a first bead layer 200 and a second bead layer 210 and performing etching for 2 times. However, without being limited thereto, N kinds of beads can be used and the etching can be performed for N times to obtain a hierarchical concavo-convex structure of the N-th order.

Even if the substrate 100 is made of a transparent material, the substrate 100 becomes opaque if the scale of the concavo-convex structure formed on the surface of the substrate 100 is 400 nm or larger.

It is because the wavelength of the light visible to the human eyes is from 400 nm to 700 nm. Accordingly, in order to obtain a transparent super water repellent surface, it is preferable that the size of the beads of the (N+1)-th bead layer 210 be 400 nm or smaller.

However, since there may be a situation where an opaque surface is required, the process for the preparation of a super water repellent surface in accordance with the present invention is advantageous, in an aspect, that the transparency of the substrate 100 can be controlled at random using beads having a size of 400 nm or larger.

FIG. 7 is a schematic view of the step of coating the fluorine compound in the process of FIG. 1. Referring to FIG. 7, after the (N)-th bead layer 200 and the (N+1)-th bead layer 210 have been removed, a fluorine compound 300 is coated on the surface of the substrate 100 (S150), in order to provide water repellency to the surface of the substrate 100.

As coated on the surface, the fluorine compound 300 lowers surface energy and provides water repellency. At present, it is frequently used as coating material for providing water repellency.

Preferably, the surface of the substrate 100 on which the fluorine compound 300 has been coated has at least one group selected from $(CF_3-)$, $-(CF_2-CF_2)n-$, $-(O(CF_2)_m)n-$, $-((CF_2)_mO)n-$, $-(OC(CF_3)FCF_2)n-$ and $-(C(CF_3)FCF_2O)n-$ (where $1=m=25$ and $1=n=100$).

The fluorine compound 300 may be coated on the surface of the substrate 100, for example, by preparing the fluorine compound 300 having at least one group selected from $(CF_3-)$, $-(CF_2-CF_2)n-$, $-(O(CF_2)_m)n-$, $-((CF_2)_mO)n-$, $-(OC(CF_3)FCF_2)n-$ and $-(C(CF_3)FCF_2O)n-$, dipping the substrate 100 in a solution in which the fluorine compound 300 is dissolved and then pulling out at a rate of 10 mm/min (dip coating) or by dropping the solution on the substrate 100 and then spinning the substrate 100 at a rotation rate of 3000 rpm (spin coating).

Alternatively, the fluorine compound 300 may be coated on the surface of the substrate 100 by the self-assembled monolayer treatment using a fluoroalkylsilane such as tridecafluoro-1,1,2,2-tetrahydrooctyl)trichlorosilane, (tridecafluoro-1,1,2,2-tetrahydrooctyl)trimethoxysilane, (tridecafluoro-1,1,2,2-tetrahydrooctyl)triethoxysilane, (heptadecafluoro-1,1,2,2-tetrahydrodecyl)trimethoxysilane and (heptadecafluoro-1,1,2,2-tetrahydrodecyl)triethoxysilane, etc.

In addition, the fluorine compound 300 may be coated on the surface of the substrate 100 by the atom transfer radical polymerization, in which transition metal-mediated halogen transfer reaction occurs. Here, for the fluorine monomer, preferably, per-fluoroalkyl acrylate, more preferably, perfluorohexylethyl acrylate may be used.

Alternatively, the fluorine compound 300 may be coated on the surface of the substrate 100 by the grafting-from surface polymerization using an azo based thermal initiator and a photoinitiator. Here, for the fluorine monomer, preferably, per-fluoroalkyl acrylate, more preferably, perfluorohexylethyl acrylate may be used.

Also, the fluorine compound 300 may be coated on the surface of the substrate 100 by the grafting-to surface polymerization of a fluorine based compound having a functional group that can form a covalent bond with the functional groups exposed on the substrate 100.

And, the fluorine compound 300 may also be coated on the surface of the substrate 100 by vaporizing the fluorine compound 300 having at least one functional group selected from $(CF_3-)$, $-(CF_2-CF_2)n-$, $-(O(CF_2)_m)n-$, $-((CF_2)_mO)n-$, $-(OC(CF_3)FCF_2)n-$ and $-(C(CF_3)FCF_2O)n-$ in a plasma chamber to form a plasma state and then graft polymerizing the free radicals formed on the surface of the fluorine compound 300 surface by exposing to the substrate 100.

In addition, these processes are also performed continuously using the roll-to-roll process in one process line.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A process for the preparation of a super water repellent surface comprising the steps of:
    arranging a plurality of spherical beads on the surface of a substrate to form a (N)-th bead layer;
    etching the substrate surface with the (N)-th bead layer as etching mask;
    arranging a plurality of spherical beads, which are larger than the (N)-th beads in diameter, on the etched substrate surface to form a (N+1)-th bead layer;
    etching the substrate surface with the (N+1)-th bead layer as etching mask;
    removing the beads from the etched substrate surface; and
    coating a fluorine compound on the substrate surface on which a hierarchical concavo-convex structure has been formed,
    wherein the (N+1)-th bead layer forming step and the (N+1)-th etching step are repeated for N times.

2. The process for the preparation of a super water repellent surface as set forth in claim 1,
wherein the (N)-th bead layer is formed on the substrate surface by at least one method selected from spin coating, dip coating, lifting up, electrophoretic deposition, chemical or electrochemical deposition and electrospray, Langmuir-Blodgett(LB), and transfer the beads monolayer to substrate using printing.

3. The process for the preparation of a super water repellent surface as set forth in claim 1,
    wherein the etching is performed by dry etching using an etching gas.

4. The process for the preparation of a super water repellent surface as set forth in claim 3,
    wherein the substrate is selected from glass, quartz plate, silicon, plastic and polymer film.

5. The process for the preparation of a super water repellent surface as set forth in claim 3,
    wherein the etching gas may be at least one selected from $CF_4$, $CHF_3$, $C_2F_6$, $C_3F_6$, $C_3F_8$, $C_4F_{10}$, HF, HBr, $SF_6$, $NF_3$, $SiCl_4$, $SiF_4$, $BCl_3$, $CCl_4$, $CClF_3$, $CCl_2F_2$, $C_2ClF_5$ and $O_2$.

6. The process for the preparation of a super water repellent surface as set forth in claim 5,
    wherein the etching gas is a mixture including $H_2$.

7. The process for the preparation of a super water repellent surface as set forth in claim 1,
    wherein the substrate surface on which the fluorine compound has been coated has at least one group selected from $(CF_3-)$, $-(CF_2-CF_2)_n-$, $-(O(CF_2)_m)_n-$, $-((CF_2)_mO)_n-$, $-(OC(CF_3)FCF_2)_n-$ and $-(C(CF_3)FCF_2O)_n-$,
    where $1 \leq m 25$ and $1 \leq n \leq 100$.

8. The process for the preparation of a super water repellent surface as set forth in claim 7,
    wherein the coating of the fluorine compound may be performed by at least one method selected from dip coating, spin coating, spray, self-assembled monolayer treatment of fluorosilane based compounds, surface polymerization by atom transfer radical polymerization of fluorine based monomers, grafting-from surface polymerization of fluorine based monomers, grafting-to surface polymerization of fluorine based compounds, surface polymerization of fluorine based compounds using plasma and surface modification of fluorine compounds using plasma.

9. The process for the preparation of a super water repellent surface as set forth in claim 8,
the process is performed continuously by the roll-to-roll method in one processing line.

10. The process for the preparation of a super water repellent surface as set forth in claim 6,
    wherein N is a natural number 49 or smaller.

11. The process for the preparation of a super water repellent surface as set forth in claim 2,
    wherein the etching is performed by dry etching using an etching gas.

12. The process for the preparation of a super water repellent surface as set forth in claim 2,
    wherein the substrate surface on which the fluorine compound has been coated has at least one group selected from $(CF_3-)$, $-(CF_2-CF_2)_n-$, $-(O(CF_2)_m)_n-$, $-((CF_2)_mO)_n-$, $-(OC(CF_3)FCF_2)_n-$ and $-(C(CF_3)FCF_2O)_n-$,
where $1 \leq m \leq 25$ and $1 \leq n \leq 100$.

13. The process for the preparation of a super water repellent surface as set forth in claim 8,
wherein N is a natural number 49 or smaller.

* * * * *